US012591838B2

(12) United States Patent
Bandi et al.

(10) Patent No.: US 12,591,838 B2
(45) Date of Patent: Mar. 31, 2026

(54) SYSTEMS AND METHODS FOR AIDING IN THE DELIVERY OF PACKAGES USING VEHICLE SENSORS

(71) Applicant: Ford Global Technologies, LLC, Dearborn, MI (US)

(72) Inventors: Krishna Bandi, Farmington Hills, MI (US); Nancy Lewis, Ann Arbor, MI (US); Swetha Shailendra, Royal Oak, MI (US); Chitra Varanasi, Canton, MI (US)

( * ) Notice: Subject to any disclaimer, the term of this patent is extended or adjusted under 35 U.S.C. 154(b) by 279 days.

(21) Appl. No.: 18/066,715

(22) Filed: Dec. 15, 2022

(65) Prior Publication Data

US 2024/0202646 A1     Jun. 20, 2024

(51) Int. Cl.
| | |
|---|---|
| *G06Q 10/0832* | (2023.01) |
| *G01C 21/34* | (2006.01) |
| *G06V 20/52* | (2022.01) |
| *G06V 20/58* | (2022.01) |
| *B60R 25/01* | (2013.01) |
| *B60R 25/10* | (2013.01) |
| *B60R 25/30* | (2013.01) |
| *B60R 25/31* | (2013.01) |

(52) U.S. Cl.
CPC ..... *G06Q 10/0832* (2013.01); *G01C 21/3476* (2013.01); *G06V 20/52* (2022.01); *G06V 20/58* (2022.01); *B60R 25/01* (2013.01); *B60R 25/10* (2013.01); *B60R 25/305* (2013.01); *B60R 25/31* (2013.01); *G06V 2201/08* (2022.01)

(58) Field of Classification Search
CPC ....... B60R 25/01; B60R 25/10; B60R 25/305; B60R 25/31; G01C 21/3476; G06Q 10/0832; G06V 20/52; G06V 20/58; G06V 2201/08
See application file for complete search history.

(56) References Cited

U.S. PATENT DOCUMENTS

| | | | |
|---|---|---|---|
| 8,447,703 B2 | 5/2013 | Yuasa et al. | |
| 10,233,021 B1 * | 3/2019 | Brady ................ | G06Q 10/0832 |

(Continued)

FOREIGN PATENT DOCUMENTS

| | | | | |
|---|---|---|---|---|
| CN | 202522903 U | 11/2012 | | |
| DE | 10149454 A1 * | 4/2003 | ........... | B65G 1/1371 |
| DE | 102005062275 A1 * | 6/2007 | ............. | B60Q 1/525 |

OTHER PUBLICATIONS

W Priharti et al., IOT Based Logistics Vehicle Security Monitoring System, 2nd International Conference on Engineering and Applied Sciences, IOP Publishing, Series: Materials Science and Engineering 771, Mar. 2020, 1-6.

(Continued)

*Primary Examiner* — Aryan E Weisenfeld
(74) *Attorney, Agent, or Firm* — Emily Campbell; Eversheds Sutherland (US) LLP

(57) ABSTRACT

An alert system is for a vehicle. The alert system includes a sensor, a processor electrically connected to the sensor, and a memory. The memory has instructions that, when executed by the processor, cause the processor to perform operations including causing the sensor to scan for a presence, receiving instructions corresponding to an action to be taken with respect to the presence, and sending an alert notification to an operating system corresponding to the instructions.

16 Claims, 6 Drawing Sheets

(56) References Cited

U.S. PATENT DOCUMENTS

| | | | |
|---|---|---|---|
| 11,014,536 B2 | 5/2021 | Krishnan et al. | |
| 2007/0005452 A1* | 1/2007 | Klingenberg | G06Q 20/203 |
| | | | 705/334 |
| 2007/0132844 A1* | 6/2007 | Katz | H04M 3/51 |
| | | | 340/541 |
| 2011/0068915 A1* | 3/2011 | Wakefield, III | G01S 5/0009 |
| | | | 340/686.1 |
| 2018/0068544 A1* | 3/2018 | Caperell | H04W 4/027 |
| 2018/0197139 A1 | 7/2018 | Hill | |
| 2019/0244455 A1* | 8/2019 | Kim | G07C 9/32 |
| 2020/0202184 A1* | 6/2020 | Shrestha | G06F 16/9024 |
| 2021/0031772 A1* | 2/2021 | Gomora | B60W 30/09 |
| 2022/0017044 A1* | 1/2022 | Bielby | G06V 10/82 |
| 2022/0129841 A1* | 4/2022 | Gutke | G08B 13/19602 |
| 2024/0177601 A1* | 5/2024 | Cain, Jr. | G08G 1/161 |

OTHER PUBLICATIONS

Hajar Bnouachir et al., Intelligent Fleet Management System for Open Pit Mine, International Journal of advanced Computer Science and Applications, vol. 11, No. 5, Jan. 2020, 327-332.

* cited by examiner

40

41

SYSTEMS AND METHODS FOR AIDING IN THE DELIVERY OF PACKAGES USING VEHICLE SENSORS

BACKGROUND

It is common for delivery drivers to leave keys in the delivery vehicles when they walk up to doors of homes to deliver packages. In this situation, the delivery vehicle is in a position where it may be stolen. Additionally, certain other situations are of concern to the delivery vehicle and the delivery driver. These situations may include the presence of a malevolent actor, the presence of another vehicle following the delivery driver, and the presence of another vehicle swiftly approaching the delivery vehicle. Furthermore, oftentimes if a delivery driver is delivering a package, the package may be delivered to the wrong home. Customers also may want packages left in a certain location or may have packages in a certain location that need to be returned. In these situations, systems that aide the delivery driver are desired. Finally, it is desirable for delivery vehicles to be able to deliver packages to homes in the most efficient manner possible.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
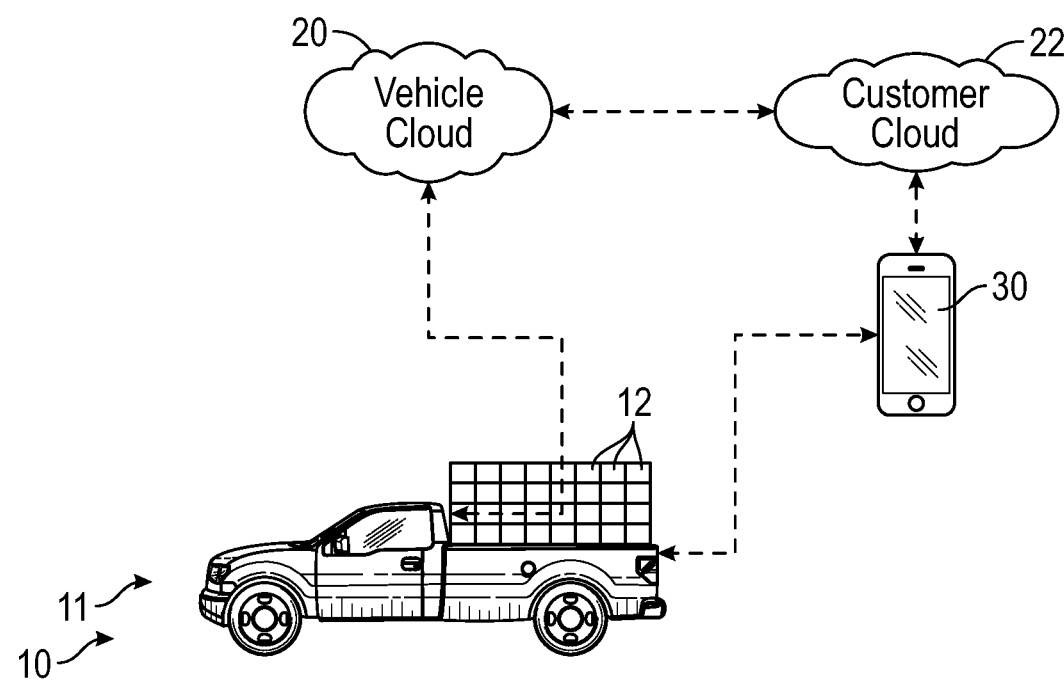
FIG. 1 depicts a vehicle and alert system therefor, and shown as employed with a mobile device, in accordance with one non-limiting embodiment of the disclosed concept.

The systems and methods disclosed herein assist in part in accurately delivering packages to homes, instructing drivers as to which packages require sign-on delivery, providing for simple return of packages, protecting vehicle drivers against theft and suspicious activity, and providing preferred driving routes for delivery drivers.

In one example, vehicle drivers can more accurately deliver packages to homes. Specifically, delivery vehicles are provided with sensors that scan for a presence. When the delivery drivers begin walking away from the vehicle, such as to carry a delivery package to a front door of a home, the sensors are configured to scan the delivery package. Data from the sensors is transmitted to a processor of the vehicle. The processor may then compare data corresponding to the delivery package to preexisting data, such as addresses for associated packages, and send alerts to various operating systems to ensure the package goes to the right address.

For instance, if after the package has been scanned, the processor determines that the delivery driver is carrying the package to the wrong address, the processor can send an alert to a mobile phone of the delivery driver, fleet manager, or the customer, thereby increasing the likelihood that the delivery driver will correct himself or herself. The processor may also send an alert to an infotainment system of the delivery vehicle, which may provide audio and visual messages to the delivery driver, thus further increasing the likelihood that the package will be correctly delivered. Additionally, a home safety system may also send instructions to the processor of the vehicle. The instructions may include where the delivery package is to be placed, that the delivery package is to require sign-on delivery, or that another package that is in a predetermined location is to be returned.

In yet a further example, the sensors scan for a presence in the form of at least one of an individual, a malevolent actor, or another vehicle. When the data from the sensors is transmitted to the processors of the vehicles, the processors determine if the presence is a threat. For example, the processors may determine that an individual is not the driver and is trying to steal the vehicle that another vehicle is following the delivery vehicle, that another vehicle is moving at an undesirably rapid speed with respect to the delivery vehicle, and that a malevolent actor, such as an armed gunman, is near the delivery vehicle. In each of these scenarios, if the processor determines that the presence is a threat, the processor can cause a vehicle alert response to be initiated, which can cause the delivery driver and the delivery vehicle to be better protected. The vehicle alert response can include any one or combination of sounding a horn of the vehicle, flashing lights of the vehicle, taking pictures of an individual with the sensor, sending a wireless alert notification to an external device, and locking doors of the vehicle.

In an additional example embodiment, a processor of a delivery vehicle is configured to receive data corresponding to a number of vehicle parameters and addresses of a number of delivery packages, and provide a preferred driving route to a driver of the vehicle based on the data. The vehicle parameters may include an amount of gas in a tank of the vehicle, or an amount of charge left in a battery of the vehicle. As such, with this data input to the processor, the processor can work with, for example, a vehicle global navigation satellite system to provide preferred driving routes to the delivery driver, so that the delivery packages can efficiently be delivered with the existing parameters of the delivery vehicle.

ILLUSTRATIVE EMBODIMENTS

The disclosure will be described more fully hereinafter with reference to the accompanying drawings, in which example embodiments of the disclosure are shown, and not intended to be limiting.

As employed herein, the term "number" shall mean one or an integer greater than one (i.e., a plurality).

As employed herein, the term "coupled" shall mean connected either directly or through one or more intermediate parts or components.

FIG. 1 shows a vehicle 10 and alert system 11 therefor, and is shown in use with a mobile device (e.g., mobile phone 30) via a vehicle cloud 20 and a customer cloud 22. The vehicle 10 may be a delivery vehicle configured to deliver a plurality of delivery packages 12. The packages 12 may be in the form of food, medical supplies, groceries, other online deliveries, or non-internet-based deliveries. As will be discussed below, the alert system 11 advantageously provides a mechanism to alert a driver (not shown in FIG. 1, but see delivery driver 44 shown in FIG. 2) that the packages 12 are not being properly delivered.

Figure 2:
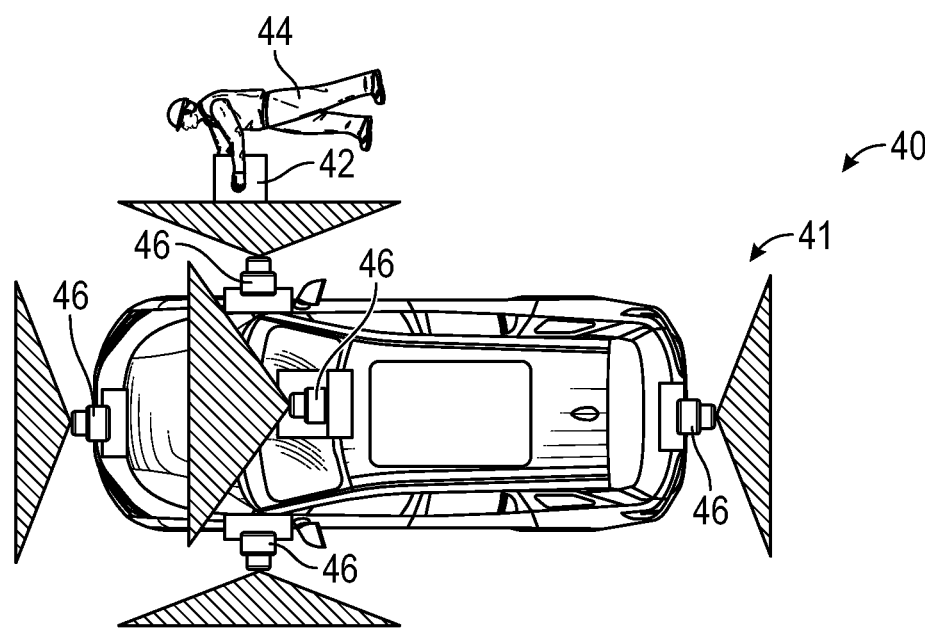
FIG. 2 depicts another vehicle and alert system therefor, structured like the vehicle and alert system of FIG. 1.

For example, FIG. 2 shows another vehicle 40 and alert system 41 therefor, structured like the vehicle 10, and also configured for use with a mobile device via a vehicle and customer cloud. As shown, the vehicle 40 includes a number of sensors 46 each configured to scan for a presence. While the example of FIG. 2 is provided with five sensors 46, it will be appreciated that vehicle and alert systems therefor in accordance with the disclosed concept may have any suitable alternative number of sensors (e.g., one, two, three, four, six, etc.), without departing from the scope of the disclosed concept. Additionally, in one example embodiment, the sensors 46 are in the form of high-resolution cameras that are 360-degree sensors. The sensors 46 may be manufactured by Mobileye® of Jerusalem, Israel.

As shown in FIG. 2, the delivery driver 44 is holding a package 42, and one of the sensors 46 is scanning the package 42 for verification of package authentication. This may present as the delivery driver 44 grasping the package 42 and walking from the vehicle 40 toward a home in order to deliver the package to the home, e.g., without limitation, to leave the package 42 near a front door of the home. When the sensor 46 scans the package 42, the sensor 46 verifies the authentication of the package in a number of ways including scanning packaging labels, barcodes, and/or package dimensions. The sensor 46 may take a snap-shot of the package 42, which may include both audio and visual data. Scanning with the sensor 46 in this manner allows an intended delivery address for the package 42 to be ascertained. Additionally, after the sensor 46 scans the package 42, the sensor 46 is then configured to transmit data corresponding to the package 42 to the vehicle 40.

Figure 3:
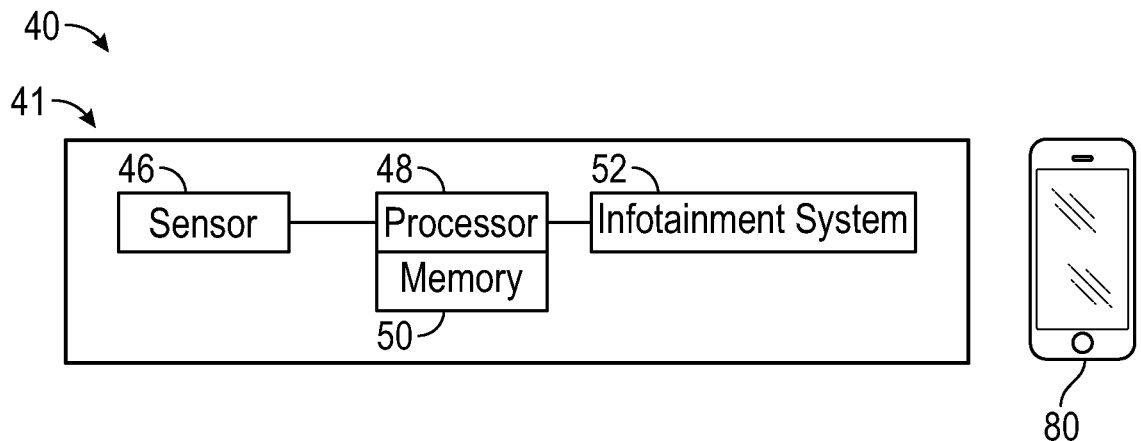
FIG. 3 depicts a simplified view of the vehicle and alert system therefor of FIG. 2, and shown with a mobile device.

More specifically, as shown in FIG. 3, the vehicle 40 further includes a processor 48, a memory 50, and an infotainment system 52. The processor 48 is electrically connected to the sensor 46 and the infotainment system 52, and is configured to employ algorithms to perform operations in accordance with the disclosed concept. The memory 50 includes instructions that, when executed by the processor 48, cause the processor 48 to perform operations including causing the sensor 46 to scan for a presence (e.g., the package 42), receiving instructions corresponding to an action to be taken with respect to the presence, and sending an alert notification to an operating system corresponding to the instructions. Additionally, the processor 48 may further be caused to compare data corresponding to the delivery package 42 to preexisting data in order to verify authentication of the delivery package.

Stated differently, once the processor 48 causes the sensor 46 to scan for the presence (e.g., the package 42), the processor 48 receives data about that package 42 from the sensor 46. The processor 48 may then communicate with the vehicle cloud 20 (or with a website) which has information corresponding to the proper delivery address for said package 42. The processor 48 may then make the aforementioned comparison. That is, the processor 48 may compare the data retrieved by the sensor 46 corresponding to the package 42 to preexisting data from the vehicle cloud 20. The preexisting data may be in the form of stored information about the proper address at which the package 42 is to be delivered. This data may be input into the system 41 by customers when using websites, delivery drivers, fleet managers, or other similar personnel before the delivery driver actually goes to a home.

Accordingly, when the delivery driver 44 (FIG. 2) is walking away from the delivery vehicle 40 in order to deliver the package 42, the alert system 41 can alert the delivery driver 44, a fleet manager (e.g., an individual managing a team of delivery drivers), and a customer (e.g., an individual who the package 42 is intended for) of any mis-delivery. For example, if the delivery driver 44 is walking toward a house "A" with the package 42, and the package 42 is supposed to be delivered to a house "B", the processor 48 of the alert system 41 can cause an alert notification to be sent to an operating system.

That is, after the sensor 46 has scanned the package 42, and the processor has determined that the package 42 is being delivered to the wrong address (e.g., via the aforementioned comparison), the processor 48 can receive instructions from, for example, the vehicle cloud 20 that the delivery driver 44 is to cease delivering the package 42 to the wrong address and is to deliver it to the correct address. Once the instructions are received at the processor 48, the processor 48 can immediately send an alert to an operating system (e.g., without limitation, the infotainment system 52 and/or a mobile device (e.g., mobile phone 80)). Mobile phones like the mobile phone 80 may be on any or all of the delivery driver 44, a customer (e.g., a recipient of the package 42 or an addressee where the package may be mistakenly being delivered), and/or a fleet manager so that all of these individuals are alerted to any potential mis-delivery. Additionally, once the alert is sent to the infotainment system 52 of the vehicle 40, the infotainment system 52 can provide audio and visual alerts to the driver 44 so that the driver is aware of the potential mis-delivery. Thus, the delivery driver 44 is able to more accurately and efficiently deliver the packages 42 to the intended recipients.

Figure 4:
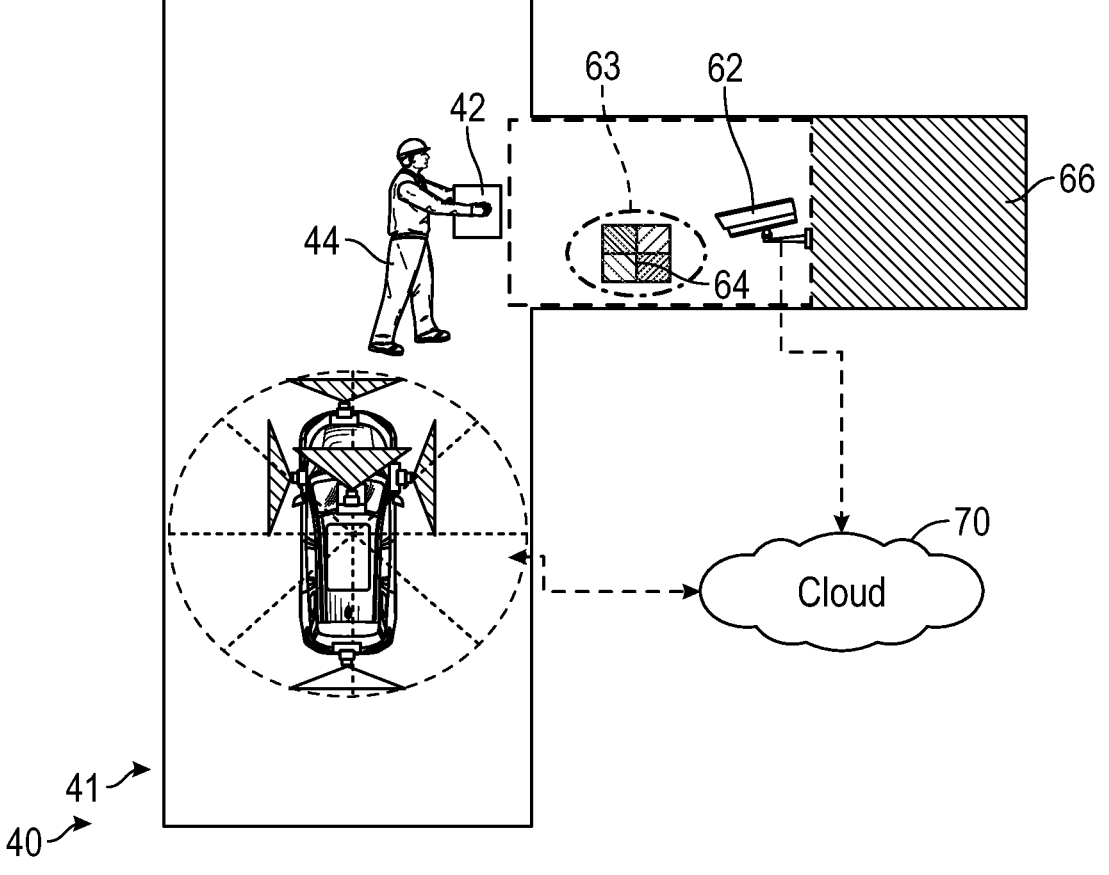
FIG. 4 depicts the vehicle and alert system therefor of FIG. 3 as employed with a home safety system, in accordance with another non-limiting embodiment of the disclosed concept.

FIG. 4 shows another use case for the alert system 41. As shown, a home 66 is provided with a home safety system 62. It will be appreciated that in addition to scanning for the packages 42, the sensor 46, or an alternative sensor, is further caused to scan for another presence in the form of the home safety system 62. In the example of FIG. 4, it will be appreciated that instructions corresponding to an action to be taken with the package 42 are sent from the home safety system 62. As shown, the home safety system 62 has a predetermined package delivery area 63. This area 63 may be in the form of a package delivery container or a predetermined area on a sidewalk or other space. In the case of the predetermined package delivery area 63 being a container, it will be appreciated that such a use case advantageously protects against potential theft. For example, the delivery driver 44 may now receive instructions to place the delivery package 42 in a container, rather than otherwise leaving the package 42 on an unmonitored front porch.

In one example embodiment, the instructions from the home safety system 62, which are received at the processor 48 of the vehicle 40, include either placing the delivery package 42 in the predetermined package delivery area 63 or removing another package 64 from the predetermined package delivery area 63 for return. The home safety system 62 may also send instructions to the processor 48 including requiring the delivery driver 44 to receive a signature upon delivering the delivery package 42. In the case of return of the package 64 and the leaving the package 42 at the predetermined package delivery area 63, it will be appreciated that the disclosed concept includes dropping off and picking up packages, which may be recycling packages, in a safe and secure location.

As a result, the alert system 41 of the disclosed concept may be employed with the home safety system 62 to further ensure accuracy and efficiency in the delivery and return of the packages 42,64. Specifically, sensors 46 can scan for the home safety system 62, and the home safety system 62 can send instructions to the processor 48, which in turn, via a cloud 70 can send an alert corresponding to the instructions to any one or all of a mobile device of the delivery driver 44, a customer, and/or a fleet manager. The alert system 41 thus provides a beneficial mechanism for desires of customers (e.g., where they want their packages to be left and/or that they want returned packages 64 to be taken by the delivery driver 44) and suppliers (e.g., that packages 42 need to require a signature) to be accounted for when packages 42,64 are being delivered and returned.

Figure 5:
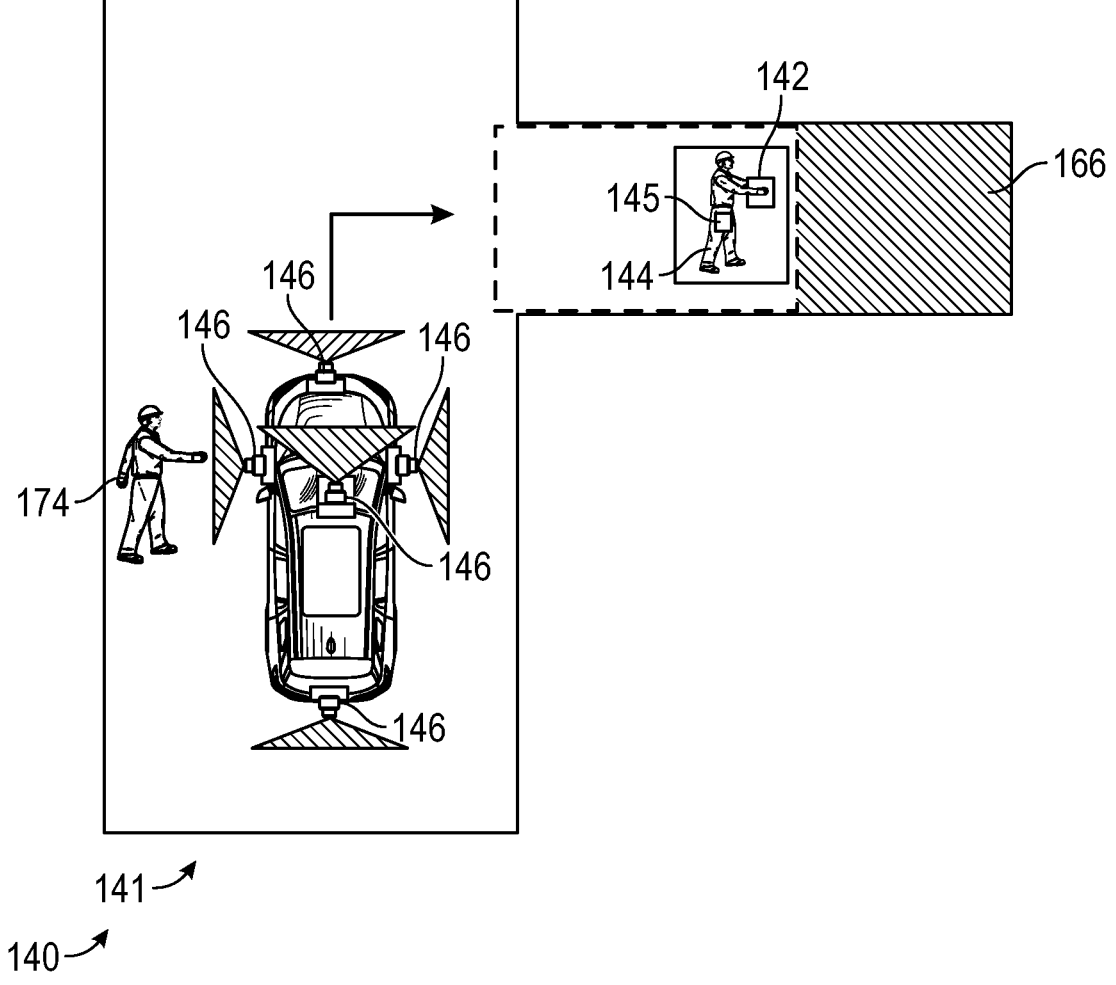
FIG. 5 depicts a vehicle and threat detection system therefor, in accordance with another non-limiting embodiment of the disclosed concept.

In another example embodiment of the disclosed concept, FIG. 5 shows a vehicle 140 and threat detection system 141 therefor. The vehicle 140 and system 141 are like the vehicle 40 and system 41, discussed above, and like numbers will be used to represent like features. As shown, the delivery driver 144 is delivering the package 142 to the home 166. In such a situation, the delivery driver 144 may leave keys in the vehicle 140. The threat detection system 141 of the disclosed concept advantageously provides a mechanism to guard against theft of the vehicle 140 in such a situation.

Figures 6, 7:
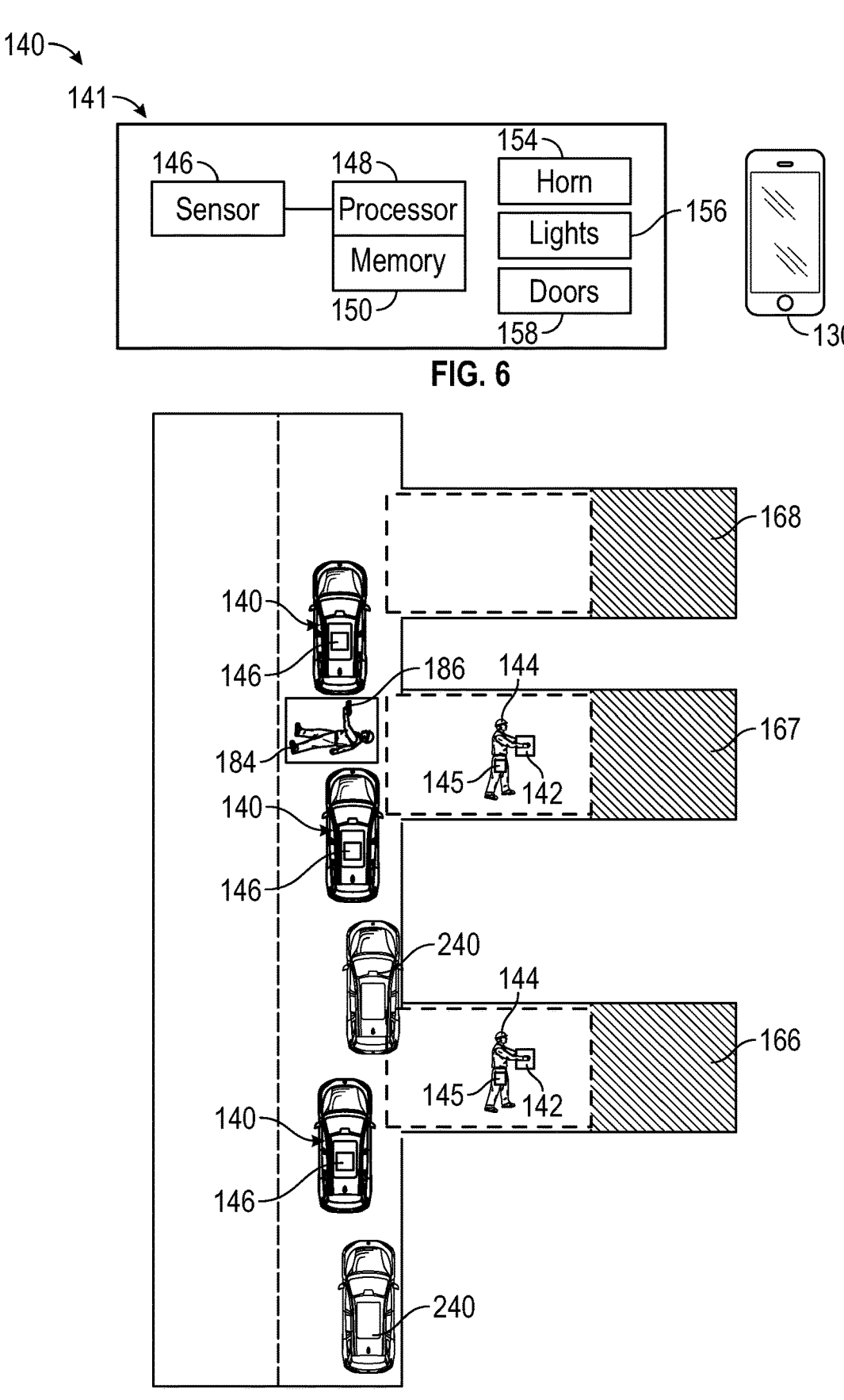
FIG. 6 depicts a simplified view of the vehicle and threat detection system therefor of FIG. 5, and shown with a mobile device.
FIG. 7 depicts the vehicle of FIG. 5, and is shown with another vehicle and another individual.

More specifically, and with reference to FIG. 6, the memory 150 of the vehicle 140 has instructions that, when executed by the processor 148, cause the processor 148 to perform operations including causing the sensor 146 to scan (e.g., including both visual and audio) for a presence (e.g., individual 174, FIG. 5), determining if the presence (e.g., individual 174, FIG. 5) is a threat, and initiating a vehicle alert response if the presence (individual 174, FIG. 5) is a threat. Accordingly, the sensor 146 may scan the individual 174, and if the processor 148 determines that the individual is not the delivery driver 144 and is a threat, the processor 148 may initiate the vehicle alert response. In one example embodiment, the processor 148 may also store data corresponding to the delivery driver 144.

For example, the delivery driver 144 may have a delivery badge 145 on his or her person that identifies himself or herself as the delivery driver. This provides authentication of who is the actual delivery driver. Information associated with the badge 145 may be stored by the vehicle 140 before the delivery driver 144 begins delivering the packages 142. In this manner, the vehicle 140 may perform automatic authentication for the delivery driver 144 on each corresponding day that the delivery driver 144 is scheduled to work. Additionally, the delivery driver information, e.g., identity and associated badge, may be stored by the vehicle 140 in a secure unaltered record until a fleet manager makes any updates to the delivery vehicle 140. It will thus be appreciated that if the sensor scans the driver 144 and the badge 145, the processor 148 may be configured to register the delivery driver 144 as a non-threat, thereby allowing the delivery driver 144 to drive the vehicle 140.

Accordingly, when the sensor 146 scans for the presence (e.g., the individual 174), the sensor 146 can transmit data to the processor 148 that the individual does not bear the delivery badge 145. The sensors 146 may be both internal (e.g., inside the vehicle 140) and external (e.g., on an exterior of the vehicle 140) in order to authenticate an individual as the delivery driver 144. Thus, determining if the individual 174 is a threat may include evaluating if the individual 174 is the driver 144. Any number of factors may be used to determine if the individual 174 is a threat.

Once the processor 148 determines that the individual 174 is a threat, the processor 148 can initiate the vehicle alert response. Referring to FIG. 6, the vehicle alert response may include at least one of sounding a horn 154 of the vehicle 140, flashing lights 156 of the vehicle 140, taking pictures of the individual with the sensor 146, sending a wireless alert notification to an external device (e.g., mobile phone 130), and locking doors 158 of the vehicle 140. It will be appreciated that locking the doors 158 of the vehicle may also be considered automatically moving the vehicle 140 from a delivery mode to a stationary mode.

In this manner, the threat of theft of the vehicle 140 is minimized. Specifically, if the individual 174 attempts to steal the vehicle 140, and the processor 148 determines from the scan of the sensor 146 that the individual 174 is not the delivery driver 144, any or all of the aforementioned actions will be initiated by the processor 148, thus scaring off the individual 174 and/or increasing the likelihood that he or she will be apprehended. The processor 148 may also send a wireless alert notification to law enforcement entities if the individual 174 is determined to be a threat. Alert notifications provided to the mobile phones 130 of the delivery driver, the fleet manager, the customer, and/or law enforcement entities may be live-feed alerts that share details of the threatening activity.

FIG. 7 shows another use case of the threat detection system 141 described above. FIG. 7 shows multiple positions of the vehicle 140, and also shows multiple positions of another vehicle 240. As shown, the vehicle 140 is being followed by the vehicle 240 when vehicle 140 is positioned proximate a first home 166. Additionally, the vehicle 140 is also being followed by the vehicle 240 when the vehicle 140 is positioned proximate a second home 167. In the example of FIG. 7, the sensors 146 of the vehicle 140 are configured to scan (e.g., both visual and audio) for a presence in the form of the other vehicle 240. Additionally, determining if the second vehicle 240 is a threat may include evaluating whether the second vehicle 240 is following the first vehicle 140 for a predetermined amount of time, or is following the vehicle 140 for a predetermined number of deliveries (e.g., one or more). Additionally, if a predetermined behavior threshold of the other vehicle 240 is met, the vehicle 140 may be configured to lock the doors 158 and alert the delivery driver 144 to drive to a preferred location away from the threat.

Accordingly, if the processor 148 determines that the other vehicle 240 is following the vehicle 140, the processor 148 may cause the aforementioned vehicle alert response to be initiated. This may again minimize the likelihood that the vehicle 140 will be stolen. For example, when the delivery driver 144 is delivering the package 142 to the first home 166, the sensor 146 can provide data to the processor 148 about whether the other vehicle 240 is following the delivery vehicle 140. When the vehicle 140 has moved and the delivery driver 144 proceeds to the home 167, the sensor 146 can again transmit data to the processor 148 corresponding to whether the other vehicle 240 is following the delivery vehicle 140. If a predetermined amount of time has passed, or if the other vehicle 240 is following for a predetermine amount of deliveries, the processor 148 can flag this scenario as a threat and cause the vehicle alert response to be initiated.

In another example embodiment, and continuing to refer to FIG. 7, determining if the other vehicle 240 is a threat may include measuring a speed of the vehicle 240 with respect to the vehicle 140, with the processor 148 upon receiving data from the sensor 146. If the processor 148 determines that the other vehicle 240 has a predetermined speed pattern with respect to the vehicle 140, the processor 148 may initiate the aforementioned vehicle alert response. For example, if the measured speed of the other vehicle 140 resembles a theft signature, e.g., such as the other vehicle 240 moving rapidly with respect to the vehicle 140 in a threatening manner, the vehicle alert response may protect the vehicle 140 and the driver 144.

In another example embodiment, and still referring to FIG. 7, the sensor 146 scans (e.g., both visual and audio) for a presence in the form of a malevolent actor (e.g., an individual 184 bearing a firearm 186). If the processor 148 determines that the individual 184 bearing the firearm 186 corresponds to a predetermined threat signature, the processor 148 can cause the aforementioned vehicle alert response to be initiated. It will also be appreciated that other suitable threats may be scanned for by the sensors 146 besides the individual 184.

Figure 8:
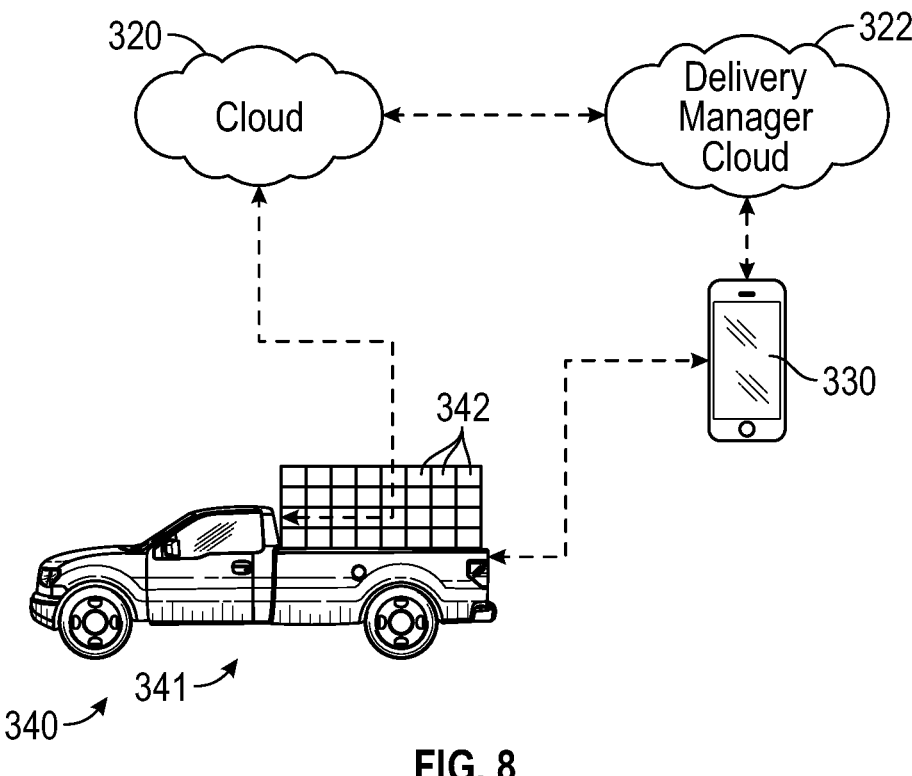
FIG. 8 depicts a vehicle and navigation system therefor, and is shown employed with a mobile device, in accordance with another non-limiting embodiment of the disclosed concept.
Figure 9:
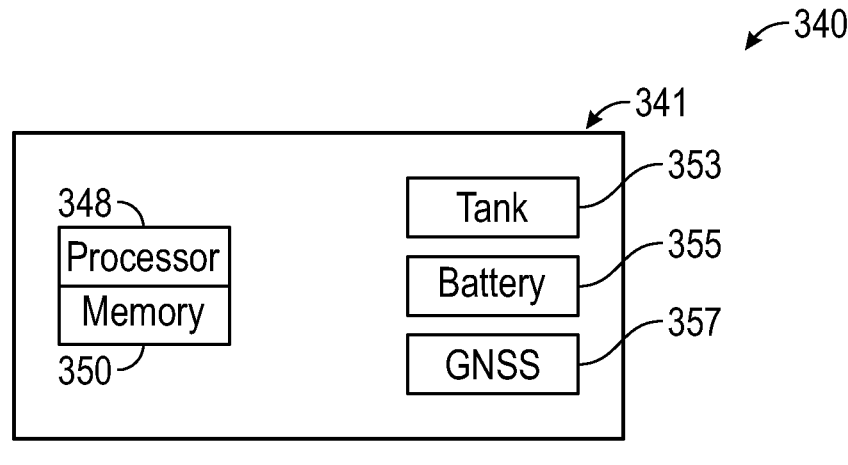
FIG. 9 depicts a simplified view of the vehicle and navigation system therefor of FIG. 8.

In accordance with yet another aspect of the disclosed concept, FIG. 8 shows a vehicle 340 and navigation system 341 therefor, and is shown as employed with a mobile device (e.g., mobile phone 330). FIG. 9 shows a simplified view of the vehicle 340 and navigation system 341 therefor. The vehicle 340 is like the vehicles 40,140, discussed above, and like numbers represent like features. In one example embodiment, the memory 350 has instructions that, when executed by the processor 348, cause the processor 348 to perform operations including receiving data corresponding to a number of vehicle parameters and addresses of a number of delivery packages 342, and providing a preferred driving route to a driver of the vehicle 340 based on the data. The vehicle parameters may include, for example, at least one of an amount of gasoline left in a tank 353 of the vehicle 340 and an amount of charge left in a battery 355 of the vehicle 340.

Accordingly, the processor 348 is configured to receive input corresponding to the vehicle parameters, and provide a preferred a driving route. The processor 348 may provide the preferred driving route by employing a vehicle global navigation satellite system (GNSS) 357 of the vehicle 340 in order to determine the preferred driving route. In one example embodiment, the vehicle 340 is configured to automatically provide the preferred driving route to the delivery driver.

It will thus be appreciated that the navigation system 341 may provide preferred driving routes to delivery drivers based on data corresponding to the packages 342 and data corresponding to the vehicle 340. This may occur when an operating system of the vehicle 340 is in a delivery mode. The processor 348 of the vehicle 340 may factor in data corresponding to location guidance and vehicle readiness (e.g., vehicle charging data, fuel level data, and vehicle self-diagnostic checks) for before and after the delivery of the packages 42. The package data may be input into the instructions of the memory 350 by the vehicle driver and/or a fleet manager and/or a customer using a website, and may include scanning a barcode of each of the delivery packages 342, manually entering address information corresponding to each of the packages 342 into the system 341, or receiving into the system 341 data from a website corresponding to addresses associated with the packages 342.

Once the data corresponding to the packages 342 (e.g., the addresses associated with each of the packages 342) is known, the processor 348 can evaluate that data in conjunction with data corresponding to the vehicle parameters. For instance, the processor 348 can determine that a first one of the packages 342 requires 10 miles of driving and a second one of the packages 342 requires 20 miles of driving. The processor 348 can then evaluate whether the amount of gas in the tank 353 or charge in the battery 355 will sustain either of those trips and if so, employ the vehicle GNSS 357 to provide preferred driving routes to reach the addresses of those two packages 342 in the most efficient manner possible.

Figure 10:
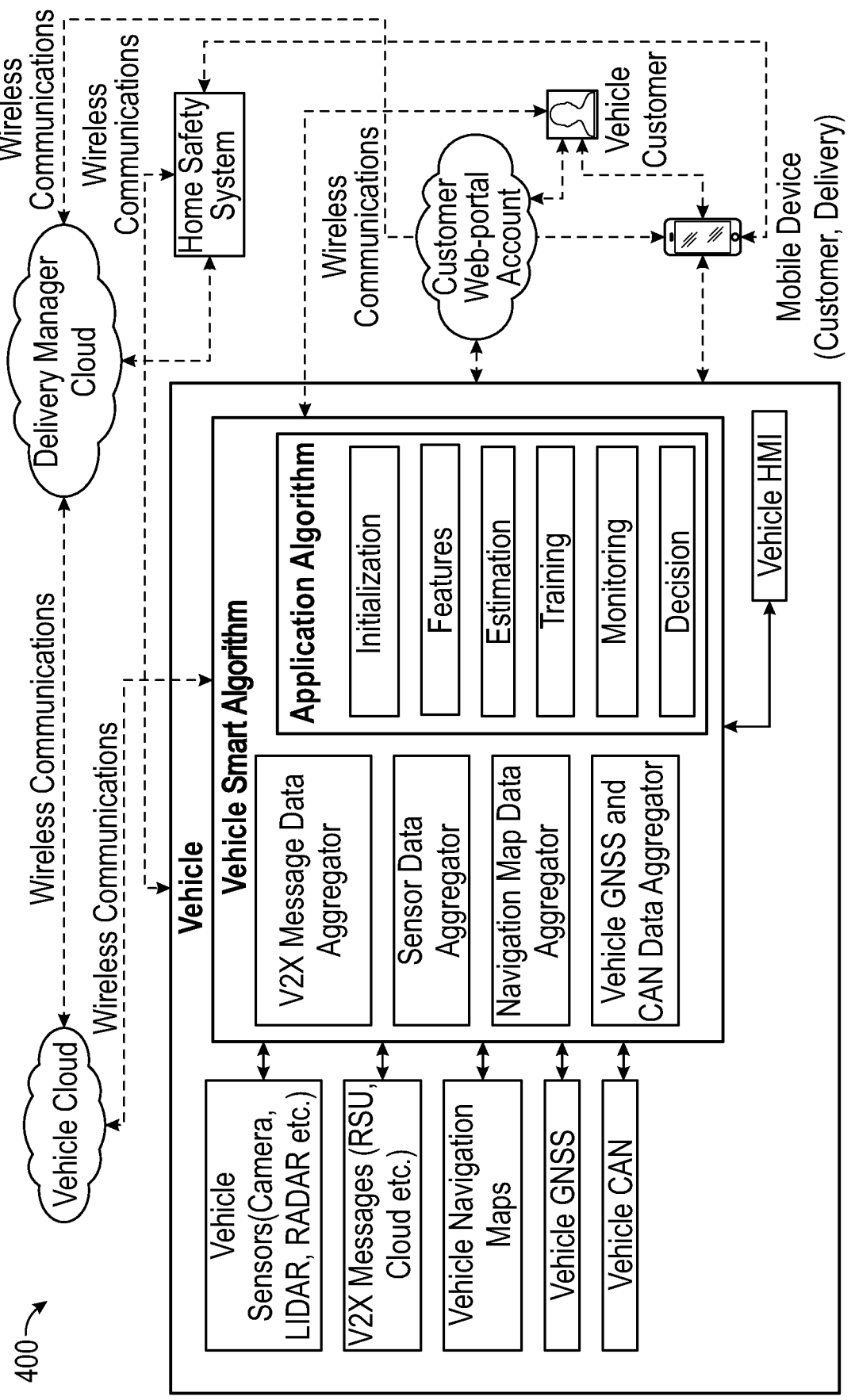
FIG. 10 depicts an end-to-end high-level system diagram corresponding to embodiments of the disclosed concept.

FIG. 10 depicts an end-to-end high-level system diagram 400 corresponding to embodiments of the disclosed concept.

Accordingly, it will be appreciated that the disclosed concept provides for a new (e.g., able to accurately deliver packages 42,142,342, able to easily allow packages 42 to require sign-on delivery, able to provide for simple return of packages 64, better protected against theft and suspicious activity, and better able to provide preferred driving routes) system 11,41,141,341 for a vehicle 10,40,140,340, in which, in one example, vehicle sensors 46,146 may scan for a presence, and processors 48,148 may either send alert notifications based on instructions corresponding to actions to be taken with respect to the presence, or initiate vehicle alert responses if the presence is a threat. In another example, a processor 348 may provide a preferred driving route to a driver of the vehicle 340 based on data corresponding to a number of delivery packages 342 and a number of parameters of the vehicle 340.

While the disclosed concept has been described in association with the vehicles 10,40,140,340 including corresponding alert systems 11,41, threat detection systems 141, and navigation systems 341, it will be appreciated that a suitable alternative vehicle could individually include any number of the disclosed systems 11,41,141,341, without departing from the scope of the disclosed concept.

The vehicles 40,140,340 may take the form of a passenger or commercial automobile such as, for example, a performance vehicle, a sport utility vehicle, a car, a truck, a crossover vehicle, a van, a minivan, a taxi, a bus, etc., and may be configured and/or programmed to include various types of automotive drive systems. Example drive systems can include various types of internal combustion engines (ICEs) powertrains having a gasoline, diesel, or natural gas-powered combustion engine with conventional drive components such as, a transmission, a drive shaft, a differential, etc.

The vehicles 40,140,340 may be configured as an electric vehicle (EV). More particularly, the vehicles 40,140,340 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicles 40,140,340 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicles 40,140,340 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation, and may not include human operational driving controls.

Additionally, the processors 48,148,348 may be commercially available general-purpose processors, such as a processor from the Intel® or ARM® architecture families. The memories 50,150,350 may be a non-transitory computer-readable memory storing program code, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An alert system for a vehicle, comprising:
   a sensor;
   a processor electrically connected to the sensor; and
   a memory comprising instructions that, when executed by the processor, cause the processor to perform operations comprising:
   receiving first data corresponding to a first number of parameters of the vehicle and second data including addresses of a second number of packages;
   determining, using a global navigation satellite system of the vehicle and based on the first data and the second data, a preferred driving route for the vehicle;
   causing the sensor to scan for a presence of a package in a vicinity of the vehicle, wherein the package is part of the second number of packages;
   capturing, using the sensor, data about the package;
   determining, based on comparing the data with preexisting data, a first delivery location associated with the package;
   determining that the package is being delivered to a second location;
   while the package is in motion toward the second location, determining that the second location is not the same as the first delivery location;
   receiving, from a home safety system associated with the first delivery location, instructions corresponding to an action to be taken with respect to the package, the action including ceasing delivery of the package to the second location; and
   sending an alert notification to a mobile device of a delivery person carrying the package, the alert notification including information about the first delivery location and instructing the delivery person to deliver the package at the first delivery location.

2. The alert system according to claim 1, wherein the processor is further configured to compare the data corresponding to the package to preexisting data in order to verify authentication of the delivery package.

3. The alert system according to claim 2, wherein the mobile device is being carried by the delivery person.

4. The alert system according to claim 2, wherein the mobile device is part of an infotainment system of the vehicle.

5. The alert system according to claim 1, wherein the first delivery location has a predetermined package delivery area, and wherein the action to be taken comprises placing a first delivery package in the predetermined package delivery area.

6. The alert system according to claim 1, wherein the action further comprises requiring the delivery person to receive a signature upon delivering the package.

7. The alert system according to claim 1, wherein the sensor is a camera.

8. A threat detection system for a delivery vehicle, comprising:
   one or more sensors,
   a processor electrically connected to the sensor; and
   a memory comprising instructions that, when executed by the processor, cause the processor to perform operations comprising:
   causing the one or more sensors to scan for a presence of a second vehicle;
   determining presence of the second vehicle;

determining whether the second vehicle is following the delivery vehicle for a predetermined number of deliveries;
   determining, based on the second vehicle following the delivery vehicle for the predetermined number of deliveries, that the second vehicle is associated with a threat;
   measuring, by the delivery vehicle and using the one or more sensors, a relative speed of the second vehicle over an amount of time with respect to the delivery vehicle; and
   determining that the relative speed of the second vehicle is consistent with a predetermined theft signature; and
   initiating a vehicle alert response.

9. The threat detection system according to claim 8, wherein initiating the vehicle alert response comprises at least one of sounding a horn of the delivery vehicle, flashing lights of the delivery vehicle, taking pictures of a driver of the second vehicle with the one or more sensors, sending a wireless alert notification to an external device, and locking doors of the delivery vehicle.

10. The threat detection system according to claim 8, wherein determining that the second vehicle is following the delivery vehicle for the predetermined number of deliveries further comprises evaluating whether the second vehicle is following the delivery vehicle for a predetermined amount of time.

11. The threat detection system according to claim 8, wherein determining comprises measuring a speed of the second vehicle with respect to the delivery vehicle.

12. The threat detection system according to claim 8, wherein initiating the vehicle alert response comprises at least one of sounding a horn of the delivery vehicle, flashing lights of the delivery vehicle, taking pictures of the second vehicle with the one or more sensors, sending a wireless alert notification to an external device, and locking doors of the delivery vehicle.

13. The threat detection system according to claim 8, wherein the presence is an individual bearing a firearm.

14. The threat detection system according to claim 8, wherein the one or more sensors is a camera.

15. The threat detection system according to claim 8, wherein determining whether the second vehicle is following the delivery vehicle for a predetermined number of deliveries, further comprises:
   determining, using the one or more sensors, presence of the second vehicle when the delivery vehicle is at a first location, at a first time, and a delivery person is delivering a first package at the first location; and
   determining, using the one or more sensors, presence of the second vehicle when the delivery vehicle is at a second location, at a second time, after the first time and the delivery person is delivering a second package at the second location.

16. The threat detection system according to claim 8, wherein the processor is further configured to perform actions comprising:
   determining, based on data from the one or more sensors, presence of a person bearing a firearm in a vicinity of the delivery vehicle; and
   initiating the vehicle alert response additionally based on detection of the person bearing the firearm.

* * * * *